US011826805B2

(12) United States Patent
Chakravarti

(10) Patent No.: US 11,826,805 B2
(45) Date of Patent: Nov. 28, 2023

(54) SYSTEMS AND METHODS FOR PRODUCTION OF METALLURGICALLY BONDED CLAD BILLET AND PRODUCTS THEREOF, AND METALLURGICALLY BONDED CLAD BILLET

(71) Applicant: Bhaven Chakravarti, Bellaire, TX (US)

(72) Inventor: Bhaven Chakravarti, Bellaire, TX (US)

( * ) Notice: Subject to any disclaimer, the term of this patent is extended or adjusted under 35 U.S.C. 154(b) by 253 days.

(21) Appl. No.: 17/325,586

(22) Filed: May 20, 2021

(65) Prior Publication Data

US 2021/0268563 A1 Sep. 2, 2021

Related U.S. Application Data

(63) Continuation-in-part of application No. 16/793,782, filed on Feb. 18, 2020.

(60) Provisional application No. 62/812,488, filed on Mar. 1, 2019.

(51) Int. Cl.
*B21C 37/06* (2006.01)
*B21C 23/22* (2006.01)
*B21C 33/00* (2006.01)
*B21C 29/00* (2006.01)

(52) U.S. Cl.
CPC ............. *B21C 37/06* (2013.01); *B21C 23/22* (2013.01); *B21C 33/004* (2013.01); *B21C 29/003* (2013.01)

(58) Field of Classification Search
CPC ........ B21C 33/004; B21C 23/22; B21C 43/00
USPC .......................................................... 72/256
See application file for complete search history.

(56) References Cited

U.S. PATENT DOCUMENTS

| 3,194,643 A | * | 7/1965 | Ma ........................ B23K 20/08 428/656 |
| 3,481,024 A | | 12/1969 | Bunn |
| 4,573,629 A | | 3/1986 | Imahashi et al. |
| 4,600,332 A | | 7/1986 | Sharp et al. |
| 4,881,679 A | | 11/1989 | Turner |
| 5,056,209 A | | 10/1991 | Ohashi et al. |
| 5,261,591 A | * | 11/1993 | Hardwick ............ B23K 20/085 228/175 |

(Continued)

FOREIGN PATENT DOCUMENTS

GB 1258141 * 12/1971

*Primary Examiner* — Katrina M Stransky
*Assistant Examiner* — Smith Oberto Bapthelus
(74) *Attorney, Agent, or Firm* — McCutcheon Joseph, PLLC

(57) ABSTRACT

A method of producing a clad billet includes inserting a solid carbon or low-alloy steel (CS) material into a hollow interior of the slightly larger diameter (CRA) cylinder so that a standoff gap is provided between an outer surface of the (CS) material and the inner diameter of the (CRA) cylinder; providing an explosive material around the (CRA) cylinder; detonating the explosive material to collapse at least the inner diameter of the corrosion resistant alloy cylinder onto the outer surface of the solid carbon or low-alloy steel material and eliminate the standoff gap, creating at least a partial metallurgical bond at an interface with the outer surface and resulting in a composite billet assembly; and extruding the composite billet assembly to reduce its size and form the clad billet having a metallurgical bond between the (CS) material and the (CRA) cylinder.

18 Claims, 13 Drawing Sheets

(56) References Cited

U.S. PATENT DOCUMENTS

| | | | |
|---|---|---|---|
| 5,332,454 A | 7/1994 | Meredith et al. | |
| 5,988,484 A | 11/1999 | Osborn et al. | |
| 6,316,126 B1 | 11/2001 | Hasegawa et al. | |
| 8,281,976 B2 * | 10/2012 | Caizza | B23K 20/085 |
| | | | 228/2.5 |
| 10,112,254 B2 | 10/2018 | Chakravarti et al. | |
| 10,941,885 B2 * | 3/2021 | Silveira E Silva | F16L 9/02 |
| 2005/0251987 A1 | 11/2005 | Urech et al. | |
| 2011/0017339 A1 * | 1/2011 | Chakravarti | B21C 37/154 |
| | | | 138/143 |
| 2017/0151611 A1 | 6/2017 | Secondi et al. | |
| 2020/0130035 A1 * | 4/2020 | Rauffmann | B21C 1/22 |

\* cited by examiner

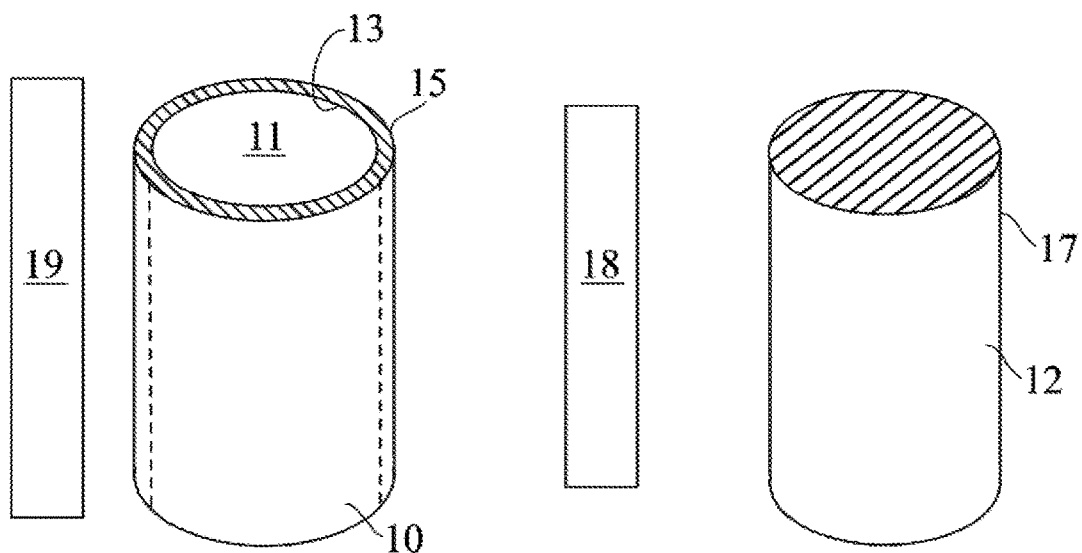
Fig. 1A  Fig. 1B
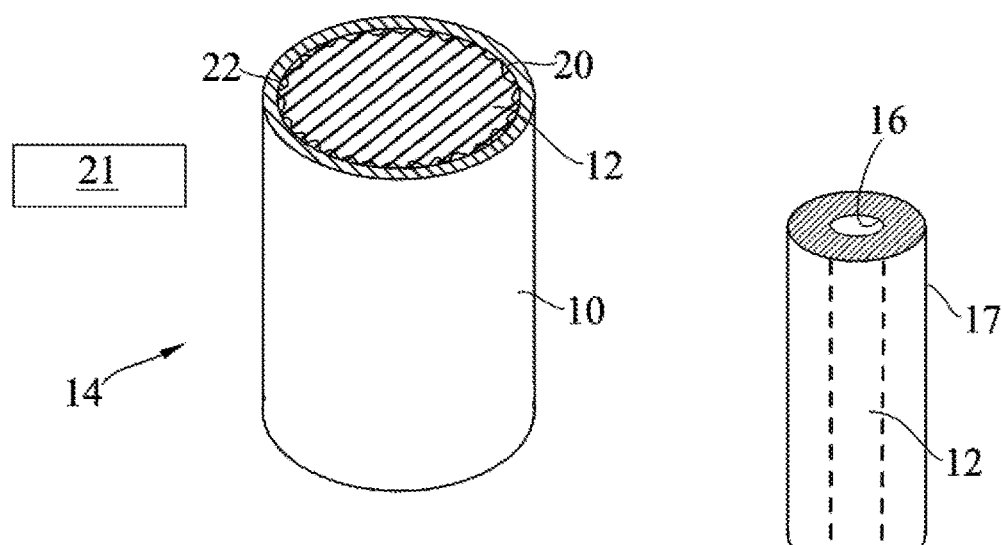
Fig. 1D
Fig. 1C

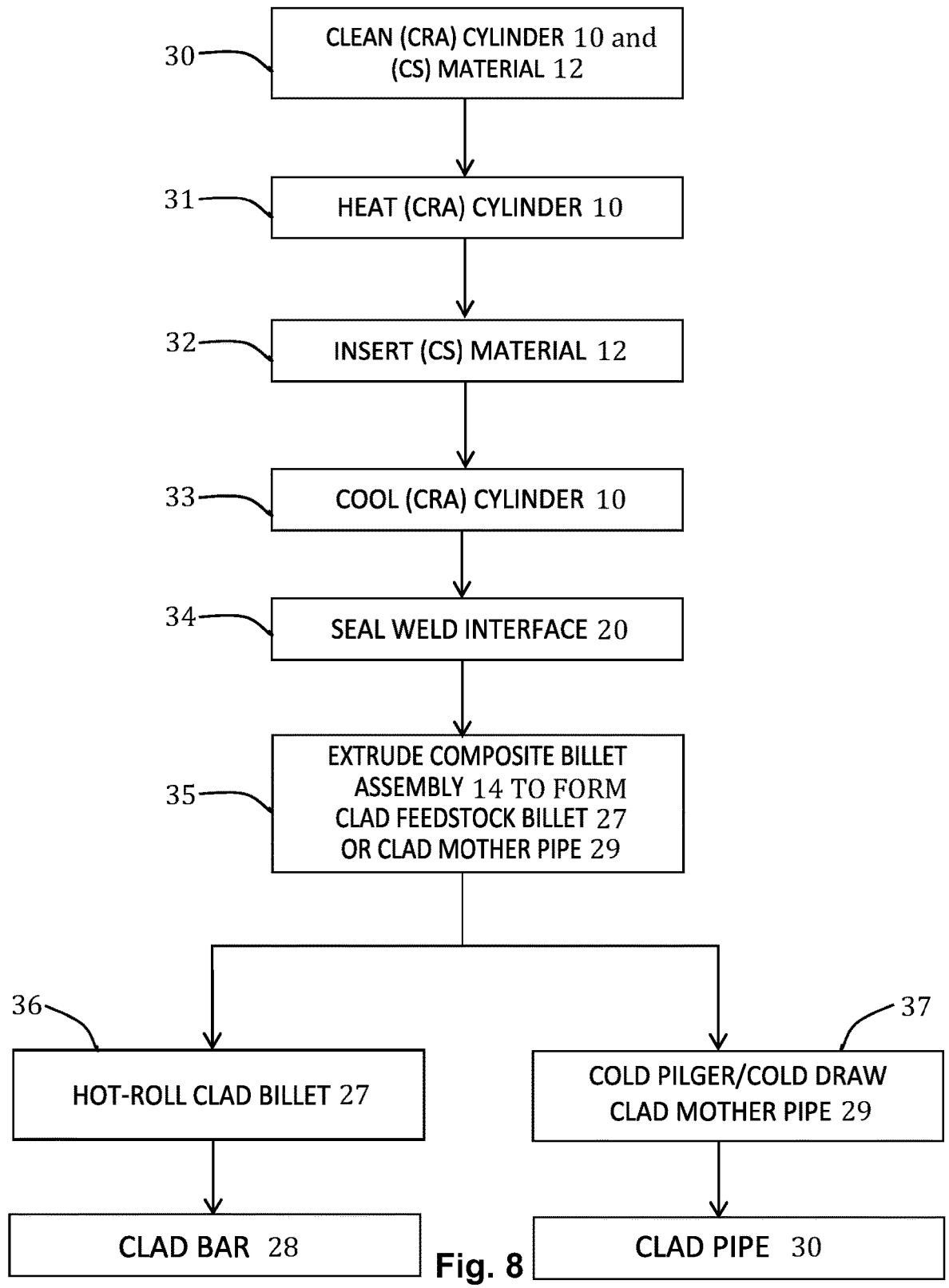

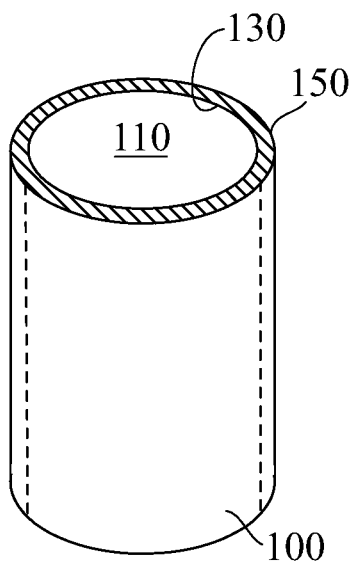
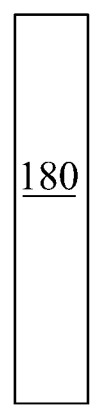
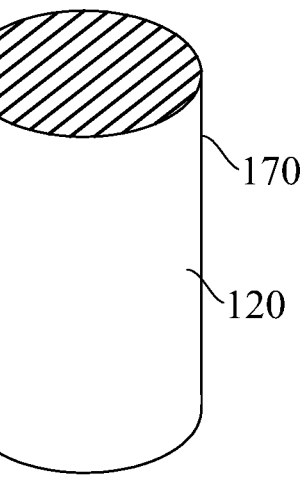
Fig. 9A Fig. 9B
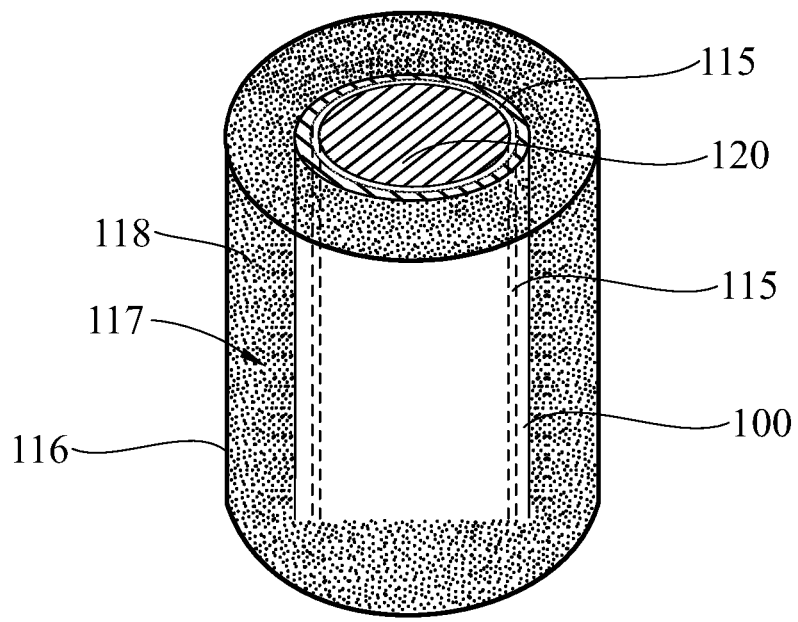
Fig. 9C

SYSTEMS AND METHODS FOR PRODUCTION OF METALLURGICALLY BONDED CLAD BILLET AND PRODUCTS THEREOF, AND METALLURGICALLY BONDED CLAD BILLET

CONTINUITY DATA

This application is a continuation-in-part of U.S. patent application Ser. No. 16/793,782, filed on Feb. 18, 2020, which claims the benefit of U.S. Provisional Application No. 62/812,488, filed on Mar. 1, 2019. The disclosures of the prior applications are hereby incorporated by reference herein in their entirety.

TECHNICAL FIELD

The present disclosure relates to methods and systems for producing a clad billet composed of solid carbon or low-alloy steel (CS) and a corrosion resistant alloy (CRA), and products thereof.

BACKGROUND

Commodity hot rolled carbon or low-alloy steel (CS) bars have widespread applications. One major application of (CS) bars is for reinforcing concrete, a popular and versatile construction material due to its high compressive strength among other properties. Due to concrete's relatively low tensile strength and inability to deform without breaking, (CS) bars (commonly referred to as "rebar") have been placed inside concrete slabs before curing. The internal (CS) bars help the cured concrete resist tensile stresses and avoid structural failure of the concrete.

Such reinforced concrete is used for buildings, marine structures, roads, bridges, and other transportation projects. In some geographic locations, chloride salts are often applied to concrete road surfaces during cold temperatures to limit icing on the roads for safety purposes. The chloride/salt solution permeates through the porous concrete and reacts with the (CS) bar, creating rust as a corrosion product. Rust weakens the (CS) bar by reducing the amount of load bearing material that provides strength. Also, rust has approximately 30% more volume than the carbon steel it replaces, and so the increased volume of the (CS) bar causes internal stress and cracking of the concrete, making the whole concrete pavement and structure prone to deterioration over time. As a result, the concrete may fail to provide a required service life. Similarly, reinforcing (CS) bar can deteriorate over time due to corrosion by being exposed to marine atmospheres, oxidizing gases, or other corroding elements, resulting in catastrophic failure. Maintenance and repair of such concrete roads currently in service have been estimated by the National Association of Corrosion Engineers (NACE) to cost around $8 billion per year. In other applications, chlorides and other corroding elements are known to attack (CS) rods by corrosion, such as (CS) sucker rods exposed to sour oil wells containing $H_2S$ and chlorides that cause corrosion and reduce the required service life.

Attempts have been made to develop a cost effective corrosion resistant (CS) bar to provide the required service life for the applications discussed above, as well as others. Corrosion resistant coatings have represented the simplest solutions, and coating systems which spray a coating material onto the (CS) bar have been developed and implemented. Such coatings, however, represent only a partial solution to the corrosion problem, due to inherent porosity in the coating and other property issues. Upgrading with solid corrosion resistant alloy (e.g., a solid stainless steel rebar) may help solve the corrosion problem, but that solution is very expensive, and drives up the cost beyond potential economic feasibility.

Attempts to produce a metallurgically bonded clad bar have been made, as an optimum material for a long term corrosion solution. For example, stainless clad rebar (SCR), in which the carbon steel core provides the mechanical properties and stainless steel surface resists the chloride corrosion, provides an optimum solution for concrete applications at a fraction of the cost of solid stainless bars. Similarly, other (CRA) claddings can provide design service life for other applications at a fraction of the solid (CRA) bar cost. Development of stainless clad rebar (SCR) with metallurgical bonding has been attempted over the years. One such process for manufacturing stainless clad steel products involves tightly wrapping a stainless steel sheathing over a carbon steel bar, with placement of various substances added at the ends and sealed to help maintain clean opposing surfaces of the bar and sheathing that form the billet. To create such a metallurgical bond requires: (i) clean, un-oxidized surfaces of both the carbon steel bar and the stainless steel sheathing; (ii) lack of oxygen between the contact surfaces for bonding to minimize or eliminate oxidation; and (iii) high pressure at high temperature applied to the bonding surfaces. The sheathing is formed around the carbon steel bar as tightly as possible to minimize the gap between the two materials. However, the tighter the gap the more difficult it is for the protective mechanism to work deep into the relatively long, e.g., 40 foot length of the sheathing. As the sealed billet is heated to rolling temperature, any surface areas left unprotected inside the billet oxidize and fail to bond, even though substantial reduction occurs on the billet at high temperature and pressure going through the stages of the rod rolling mill. This process has shown variability in metallurgical bonding from point to point within each billet, and from billet to billet, resulting in poor bonding reliability, non-uniform cladding thickness, and other issues in production, such that the resulting product fails to meet minimum metallurgical bond requirements.

Another technique for producing stainless steel clad rebar was developed utilizing the "Osprey Process," in which a molten, atomized stream of stainless steel is deposited onto a rotating, heated carbon steel bar in an evacuated chamber to build up the required stainless steel thickness. Once the required thickness is achieved, the bar is rolled through the mill to produce stainless steel clad rebar. A problem with this process is that the deposit inherently has porosity even when applied with high velocity guns. Moreover, the molten particles do not create a metallurgical (e.g., atom-to atom) bond with the carbon steel bar. The molten particle on impact is immediately quenched on hitting the carbon steel bar, creating a surface that fails to bond. Once the metallurgical bond is not formed on deposition, further processing through the mill will likewise not create the metallurgical bond. The "Osprey Process" has not been further developed for this application.

Explosion bonding is a known process to produce metallurgically bonded clad plates. This process uses an explosive detonation as the energy source to produce a metallurgical bond between two flat metal plates. Explosion bonding can clad one or more layers onto one or both faces of a base metal. In the process, the two flat plate surfaces to be bonded are cleaned by grinding or abrasive blasting to a surface finish of Ra 3 μm (140 RMS) roughness or better. The cladding plate is positioned parallel to and above the base plate with a predetermined standoff distance for the specific metals combination. The standoff distance is controlled by support spacers at the plate edges and internally, which are designed to be consumed by the explosion jet. An explosive containment frame is placed around the edges of the cladding metal plate, with the height of the frame set to contain a specific amount of explosive providing a specific energy release per unit area. When the explosive is ignited, the resultant impact creates very high-localized pressures at the collision point between the metal plates that results in a metal to metal bond without melting or diffusion.

SUMMARY

There is a critical need for a process that produces high quality, 100% metallurgically bonded (CRA) clad bars that are resistant to corrosion and do not suffer from the problems encountered with the conventional manufacturing techniques discussed above. There is also a need for such processes to be performed in a relatively fast, efficient, and inexpensive manner. A further need exists for corrosion resistant bars, pipes, sucker rods, shafts, etc., that provide a required service life in environments that are subject to corrosive materials.

In embodiments of the present disclosure achieve these needs.

Generally, stainless clad (CS) bars provide an optimum material at a fraction of the cost of solid stainless bars for resisting corrosion in concrete. The stainless clad (CS) bars have a carbon or low-alloy steel core for mechanical properties, and stainless steel cladding surface to resist corrosion problems in applications such as, for example, pavements and highways, marine structures, and other areas that are prone to corrosive materials such as chloride. The same is true for stainless clad (CS) pipes, i.e., having a cylindrical hollow (CS) material for a core. The ability to produce corrosion resistant alloy (CRA) clad bars and pipes through the integrated operations of today's rod rolling mills and cold pilger/cold draw mills, respectively, provides opportunities in maintaining productivity and controlling production cost to obtain final products of (CRA) clad bars and pipes.

Embodiments of the methods, processes and billets discussed herein provide a significant improvement over the previous attempts to produce metallurgically bonded clad billet products, such as stainless clad rebar (SCR) and stainless clad pipes, because the disclosed methods and processes assure the formation of a 100% metallurgical bond (atom-to-atom), with a uniformly distributed clad thickness, on a consistently repeatable basis, thereby avoiding the conventional problems of metallurgical bonding failures and non-uniform cladding.

The present disclosure relates to methods and systems for producing a composite billet assembly, composed of a carbon or low-alloy steel (CS) core and a corrosion resistant alloy (CRA) pipe/tube/cylinder on the outer diameter of the (CS) core, by explosion bonding. The explosion bonding results in an at least partially metallurgically bonded (atom to atom) composite billet assembly that is ready for co-extrusion. The explosion bonding may or may not result in a 100% metallurgically bonded (atom to atom) composite billet assembly. Co-extrusion of the metallurgically bonded composite billet assembly can assure a 100% metallurgically bonded (atom to atom) clad billet of a size and shape that can be directly fed to a rod rolling mill for production of various clad bar products. Note, "extrusion" and "co-extrusion" are used interchangeably in this disclosure. Alternatively, the metallurgically bonded composite billet assembly can be drilled, machined or trepanned to hollow out the center bore to form a composite billet for pipe manufacture. The hollowed-out composite bill can then be extruded to form a clad pipe directly for application, or for use as mother pipe that can be directly fed to a cold pilger/cold draw mill for production of various clad pipe products. That is, the clad composite billet comprises a carbon or low-alloy steel core with a metallurgically bonded corrosion resistant alloy cladding on the outer diameter of the steel core. This 100% metallurgically bonded clad billet works either as a final product or as an intermediate product, which may be fed to a rod rolling mill or a cold pilger/cold draw mill for further reductions to produce a variety of other finished clad products such as, Stainless Clad Rebar (SCR), Clad Sucker Rods, Clad Shafts, large diameter (e.g., 4 inches or greater) and small diameter (e.g., less than 4 inches) Clad Pipes, and other applications.

According to one embodiment, a method of producing a clad billet, comprises: providing a corrosion resistant alloy cylinder, the corrosion resistant alloy cylinder including a hollow interior, an inner diameter, and an outer diameter, inserting a solid carbon or low-alloy steel material into the hollow interior of the corrosion resistant alloy cylinder so that an outer surface of the solid carbon or low-alloy steel material faces the inner diameter of the corrosion resistant alloy cylinder, and so that a concentric standoff gap is provided between the outer surface of the solid carbon or low-alloy steel material and the inner diameter of the corrosion resistant alloy cylinder; providing an explosive material around the outer diameter of the corrosion resistant alloy cylinder; detonating the explosive material to collapse at least the inner diameter of the corrosion resistant alloy cylinder onto the outer surface of the solid carbon or low-alloy steel material and eliminate the standoff gap, creating at least a partial metallurgical bond at an interface with the outer surface and resulting in a composite billet assembly; and extruding the composite billet assembly to reduce the size of the composite billet assembly by reducing a thickness of each of the corrosion resistant alloy cylinder and the solid carbon or low-alloy steel material and form the clad billet having a metallurgical bond between the solid carbon or low-alloy steel material and the corrosion resistant alloy cylinder.

According to an embodiment, the method further comprises providing a containment frame around the outer diameter of the corrosion resistant alloy cylinder to create an annulus between the containment frame and the outer diameter of the corrosion resistant alloy cylinder, wherein the explosive material is located in the annulus.

According to another embodiment, a system for producing a clad billet, comprises: a corrosion resistant alloy cylinder including a hollow interior, an inner diameter, and an outer diameter; a solid carbon or low-alloy steel material inserted into the hollow interior of the corrosion resistant alloy cylinder so that a concentric standoff gap is provided between the outer surface of the solid carbon or low-alloy steel material and an inner diameter surface of the corrosion resistant alloy cylinder; an explosive material for surrounding the corrosion resistant alloy cylinder; an ignition source for detonating the explosive material to collapse at least the inner diameter of the corrosion resistant alloy cylinder onto the outer surface of the solid carbon or low-alloy steel material and eliminate the standoff gap, creating at least a partial metallurgical bond at an interface with the outer surface and resulting in a composite billet assembly; and an extruder for extruding the composite billet assembly to reduce the size of the composite billet assembly by reducing a thickness of each of the corrosion resistant alloy cylinder and the solid carbon or low-alloy steel material and form the clad billet having a metallurgical bond between the solid carbon or low-alloy steel material and the corrosion resistant alloy cylinder.

The foregoing is intended to give a general idea of the embodiments, and is not intended to fully define nor limit the invention. The embodiments will be more fully understood and better appreciated by reference to the following description and drawings.

BRIEF DESCRIPTION OF THE DRAWINGS

In the detailed description of various embodiments usable within the scope of the present disclosure, presented below, reference is made to the accompanying drawings, in which:

FIG. 1A illustrates an embodiment of a corrosion resistant alloy cylinder.

FIG. 1B illustrates an embodiment of a solid carbon or low-alloy steel material.

FIG. 1C illustrates another embodiment of a solid carbon or low-alloy steel cylinder material.

FIG. 1D illustrates an embodiment of a composite billet assembly.

FIG. 8 illustrates the steps associated with a method of producing a clad billet and products thereof.

FIG. 9A illustrates a second embodiment of a corrosion resistant alloy cylinder.

FIG. 9B illustrates a second embodiment of a solid carbon or low-alloy steel material.

FIG. 9C illustrates an embodiment of an arrangement of the composite billet assembly for explosion bonding.

DETAILED DESCRIPTION OF THE EMBODIMENTS

Figure 2:
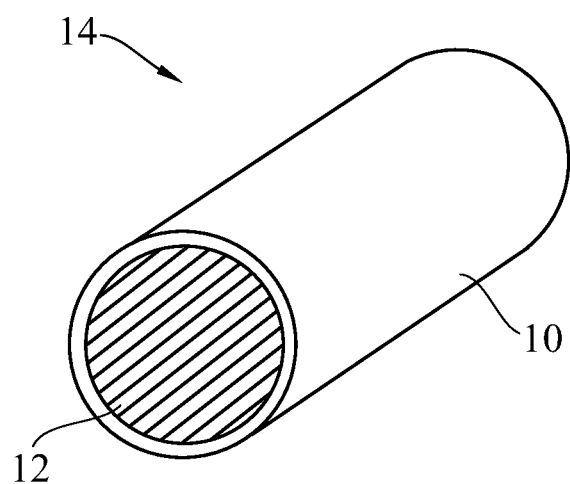
FIG. 2 illustrates a perspective view of the composite billet assembly according to an embodiment.

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

FIGS. 1A to 1D illustrate embodiments of a corrosion resistant alloy (CRA) cylinder 10, a solid carbon or low-alloy steel (CS) material 12, and a composite billet assembly 14 formed by inserting the (CS) material 12 into the (CRA) cylinder 10. The (CRA) cylinder 10, as shown in FIG. 1A, may be formed of alloys including, but not limited to, all grades of Stainless Steels, Nickel based alloys, Copper based alloys, Titanium and Ti Alloys and other corrosion resistant alloys. The (CRA) cylinder 10 may have a substantially cylindrical shape, meaning that the (CRA) cylinder 10 has a hollow interior 11 extending throughout a length of the (CRA) cylinder 10, an inner diameter 13, and an outer diameter 15. In this regard, the (CRA) cylinder 10 may be shaped as a pipe, tube, cylinder, sleeve, channel, or conduit. In a preferred embodiment, the cross-sectional shape of the (CRA) cylinder 10 is circular. However, other polygonal cross-sectional shapes, such as rectangular, pentagonal, hexagonal, octagonal, etc., are within the scope of the present embodiments. The length of the (CRA) cylinder 10 is not particularly limiting, and in a preferred embodiment the length may be about 3 feet to 5 feet. In other embodiments, the length may range from 2 feet to 6 feet. The outer diameter 15 of the (CRA) cylinder 10 is not particularly limiting, and in a preferred embodiment the outer diameter 15 may be about 4 inches to 24 inches. In other embodiments, the outer diameter 15 may range from 3 inches to 50 inches. The thickness of the (CRA) cylinder 10 is not particularly limiting, and in a preferred embodiment the thickness may be about 0.5 inches to 1.5 inches. In other embodiments, the thickness may range from 0.375 inches to 5.0 inches or more.

FIG. 1B illustrates an embodiment of the solid carbon or low-alloy steel (CS) material 12. The carbon or low-alloy steel (CS) material 12 is described herein as being a "solid", meaning that the structure or nature of the carbon or low-alloy steel (CS) material 12 is substantially rigid, as opposed to a liquid, molten or powder form. The material forming the carbon or low-alloy steel includes, but not limited to, carbon and low alloy structural grade steels, chrome moly steels, typically as covered by ASTM, ASME, AISI, API, ISI specifications and other such equivalent specifications defining design, manufacturing, and building standards. In the embodiment of FIG. 1B, the (CS) material 12 is shaped as a bar, or block of material. In an alternative embodiment shown in FIG. 1C however, the (CS) material 12 is shaped as a hollow cylinder including a hollow interior extending throughout a length of the (CS) cylinder, an inner diameter 16, and an outer diameter 17. In the alternative embodiment, the (CS) material 12 may be shaped as a pipe, tube, cylinder, sleeve, channel, or conduit. The cross-sectional shape of the (CS) cylinder may be circular. In either embodiment (bar or hollow cylinder), the length of the (CS) material 12 may be the same as the length of the (CRA) cylinder 10. The outer diameter 17 of the (CS) material 12 may have a dimension designed for an interference fit with the inner diameter 13 of the (CRA) cylinder 10. In the embodiment having a hollow cylinder (CS) material, the thickness of the cylinder may range from 0.50 inches to 3.00 inches or higher.

FIG. 1D illustrates an embodiment of a composite billet assembly 14 that is formed by inserting the (CS) material 12 into the (CRA) cylinder 10 according to the following process. To begin with, the (CS) material 12 and the (CRA) cylinder 10 may be machined as required to meet strict dimensional tolerances for a designed interference fit. Next, the mating surfaces, i.e., the inner diameter 13 of the (CRA) cylinder 10 and the outer diameter 17 of the (CS) material 12 cleaned of all contaminants and deleterious elements, such as oxides, oils, and rust, grease, industrial dust and particulates. The cleaning may be performed by a cleaning device 18, such as an abrasive blaster using an abrasive media to remove deleterious materials and leave a fresh, un-oxidized surface. Other types of cleaning devices 18 may include machining devices used to form the (CRA) cylinder 10 and the (CS) material 12 to specified tolerances, and may include solvents that remove oils and grease without leaving a residue.

The (CRA) cylinder 10 is then heated with a heater 19 to expand at least the inner diameter 13 of the (CRA) cylinder 10. The heater 19 may be a furnace, or other device that produces heat via infrared or electric resistance. Alternatively, the heater 19 may be an optical lamp source. The heater 19 may be positioned to heat the inner diameter 13 directly, or may be positioned to heat from the outer diameter 15. Heating temperatures required to expand at least the inner diameter 13 of the (CRA) cylinder 10 range from 300° F. to 1400° F. As the (CRA) cylinder 10 heats, a gap is produced between the inner diameter 13 of the (CRA) cylinder 10 and the outer diameter 17 of the (CS) material 12, allowing the (CS) material 12 to be inserted into the (CRA) cylinder 10 without resistance. The insertion may be performed with a lift device (not shown). The (CS) material 12 is then inserted into the hollow interior 11 of the heated (CRA) cylinder 10 so that the outer diameter 17 (outer surface) of the (CS) material 12 faces the inner diameter 13 of the (CRA) cylinder 10. Once the (CS) material 12 has been inserted into the heated (CRA) cylinder 10, heater 19 is turned off and the (CRA) cylinder 10 is allowed to cool. The cooling may simply be the result of turning off the heater 19 so that the (CRA) cylinder 10 is no longer subjected to the heat from the heater 19. In the cooling process, the (CRA) cylinder 10 should cool uniformly. For instance, the (CRA) cylinder 10 may cool simply by being subject to room temperature or ambient atmosphere. In other embodiments, the cooling may be accelerated by a cooling device (not shown), such as one producing forced air, that is turned on after the heater 19 is turned off. Cooling of the (CRA) cylinder 10 causes at least the inner diameter 13 of the (CRA) cylinder 10 to contract so that the inner diameter 13 shrinks onto the outer surface of diameter 17 of the (CS) material 12, creating a tight interference fit at an interface 20, or mating area of the inner diameter 13 of the (CRA) cylinder 10 and the outer surface or diameter 17 of the (CS) material 12. The mated (CS) material 12/(CRA) cylinder 10 creates a composite billet assembly 14 having a core formed by the (CS) material 12 and an outer cladding formed by the (CRA) cylinder 10. The interference fit at the interface 20 may be protected from oxidation by welding the interface 20 at opposite ends (i.e., top and bottom ends) of the composite billet assembly 14 with a welding device 21. The resulting welds 22 create a seal against oxidation of the interface 20 during heating of the composite billet assembly prior to extrusion.

Figure 3:
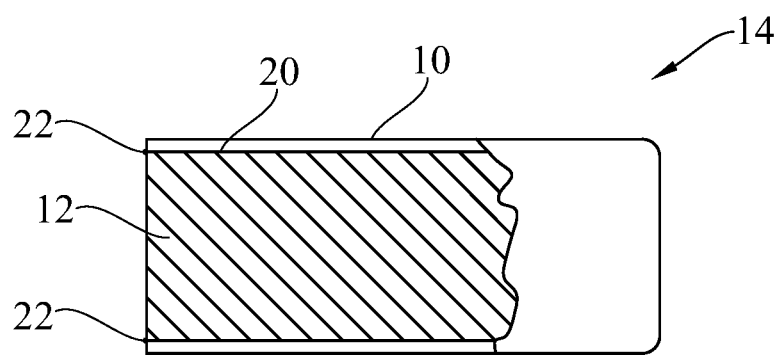
FIG. 3 illustrates a cross-sectional view of the composite billet assembly according to an embodiment.

FIG. 2 illustrates a perspective view of the composite billet assembly 14. In the illustrated embodiment, the composite billet assembly 14 includes a bar-shaped (CS) material 12 core, and so the composite billet assembly 14 has the form of a composite billet bar assembly. However, in the embodiment in which a hollow cylinder (CS) material 12 is used as the core, the composite billet assembly 14 would form a composite billet pipe assembly (not shown). FIG. 3 illustrates a cross-sectional view of the composite billet assembly 14 of FIG. 2. FIG. 3 shows a cross-sectional view of the (CS) material 12 core, the outer (CRA) cylinder 10 layer, and the welds 22 at the end of the composite billet assembly 14 that seal the interface 20.

Figure 4:
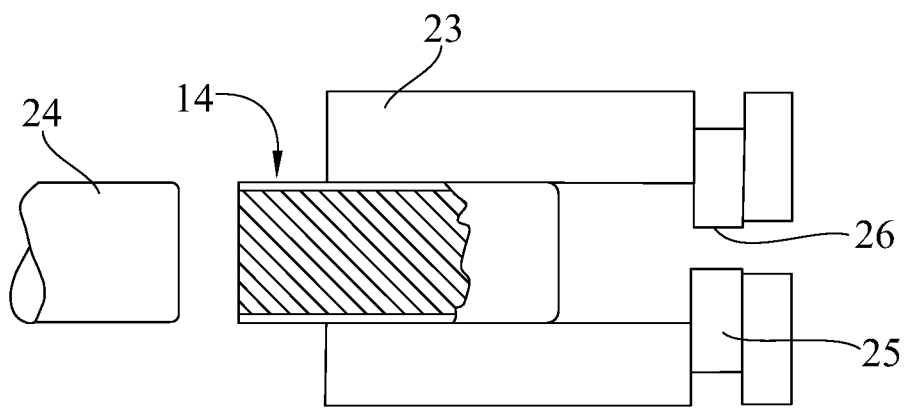
FIG. 4 illustrates an embodiment of an extrusion press.
Figure 5:
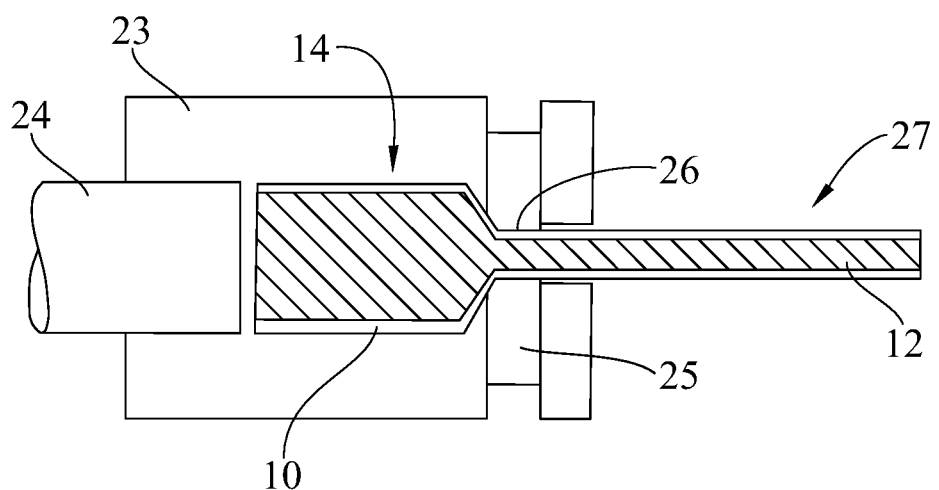
FIG. 5 illustrates an embodiment of an extrusion process.
Figure 6:
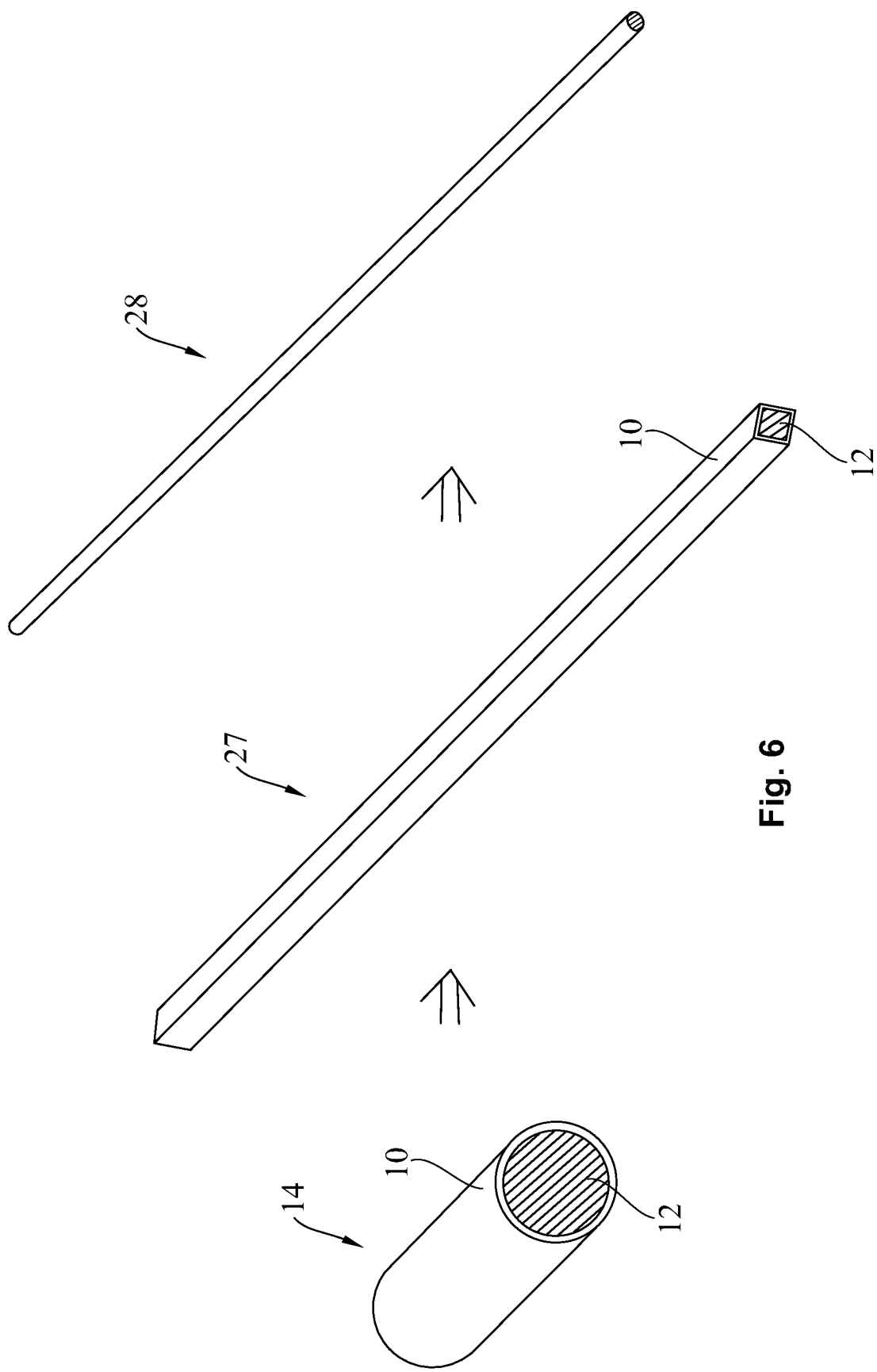
FIG. 6 illustrates the stages of a composite billet assembly, a clad feedstock billet, and a clad bar, according to an embodiment.

FIG. 4 illustrates an embodiment of an extruder, such as an extrusion press 23 for extruding the composite billet assembly 14 at high temperatures to reduce the size of the composite billet assembly 14 and form a clad feedstock billet 27 (see FIG. 6). For forming a clad pipe and/or clad mother pipe 29 (see FIG. 7) from the composite billet assembly 14, the extrusion press 23 is fitted with a cylindrical mandrel (not shown), which is inserted into the inner cylindrical opening of the composite billet assembly 14, and extends beyond the die opening 26 of the die 25 for some length to form the inner diameter of the extruded clad pipe and/or clad mother pipe. The composite billet assembly 14 is first heated in a furnace (not shown) to a predetermined high temperature and rapidly transferred to the extrusion press 23 so as to not cool below the preset extrusion temperature, and extruded at the extrusion press 23. The extrusion press 23 includes a press ram 24 that presses the composite billet assembly 14 through the die opening 26 of a die 25. During extrusion, the composite billet assembly 14 undergoes significant cross-sectional size reduction by passing through the die opening 26, as shown in FIG. 5, under very high pressures, such as 20,000 psi to 70,000 psi, depending on the capacity of the press, applied at high temperatures, such as 1800° F. to 2400° F. The size of the composite billet assembly 14 is reduced by the extrusion press 23 reducing a thickness of each of the (CRA) cylinder 10 and the solid (CS) material 12. The proportion of the thickness reduction of the (CRA) cylinder 10 and the solid (CS) material 12 is the same throughout the cross-sectional area of the composite billet assembly 14 and along the length of the of the composite billet assembly 14 as it passes through the die opening 26. As the size of the composite billet assembly 14 is reduced through the die opening 26, clean, fresh, new un-oxidized surfaces of the composite billet assembly 14 are created at the interface 20 between the (CS) material 12 and the (CRA) cylinder 10 and forced to metallurgically bond at the interface 20 as the composite billet assembly 14 elongates to its new shape. The metallurgical bond is an atom-to-atom bond between the (CS) material 12 and the (CRA) cylinder 10. In the composite billet assembly interface 20, the material of the (CS) material 12 is in intimate contact with the material of the (CRA) cylinder 10, with no gaps therebetween to entrap oxygen and oxidize upon heating. Thus, when the new surfaces are being created as the composite billet assembly 14 undergoes significant reductions at high pressures and temperatures, a 100% metallurgical bond is created between the material of the (CS) material 12 and the material of the (CRA) cylinder 10. The metallurgical bond is a critical factor for determining success or failure of the resulting clad feedstock billet 27 (see FIG. 6) and the clad pipe and/or clad mother pipe 29 (see FIG. 7). Once the bond is created, it is nearly indestructible, with the two materials of the (CS) material 12 and the (CRA) cylinder 10 joined to become one unitized material and perform just like any other solid material. This allows the clad feedstock billet 27 to then be hot rolled to a clad bar 28 (see FIG. 6) in the form of, for example, rebar, sucker rod stock, shafts and other products that can be easily bent, fabricated in a shop and the field, and welded as needed, to provide excellent service and design life in corrosive environments. Similarly, the clad pipe is used directly and/or the clad mother pipe 29 is then cold pilgered and/or cold drawn to a clad pipe 30 (see FIG. 7) that can be easily bent, fabricated in a shop and the field, and welded as needed, to provide better service and design life in corrosive environments. It is noted that the thickness of the (CRA) cylinder 10 before extrusion is drastically reduced proportionately after extrusion, so that the (CRA) cylinder 10 forms a relatively thin clad material layer around the outer diameter of the clad feedstock billet 27 (see FIG. 6), clad pipe and the clad mother pipe 29 (see FIG. 7).

The cross-sectional shape of the clad feedstock billet 27, shown in FIG. 6, after the extruding process is not particularly limiting, and in preferred embodiments the cross-sectional shape is one of a circle, a cylinder, a rectangle, and a square. The cross-sectional shape is determined by the shape of the die opening 26, and so the die opening 26 may have a shape that is one of a circle, a cylinder, a rectangle, and a square. Other polygonal cross-sectional shapes are possible, and depend on the shape of the die opening 26. That is, the die opening 26 may have a polygonal or angular shape other than a circle, a cylinder, a rectangle, and a square. Thus, the clad feedstock billet 27 can be produced to the exact feedstock dimensional requirements of a rod rolling mill. The cross-sectional shape of the clad pipe and/or the clad mother pipe 29, shown in FIG. 7, after the extruding process is circular according to a preferred embodiment. The clad mother pipe 29 can be produced to the exact dimensional requirements of a cold pilger/cold draw mill.

Figure 7:
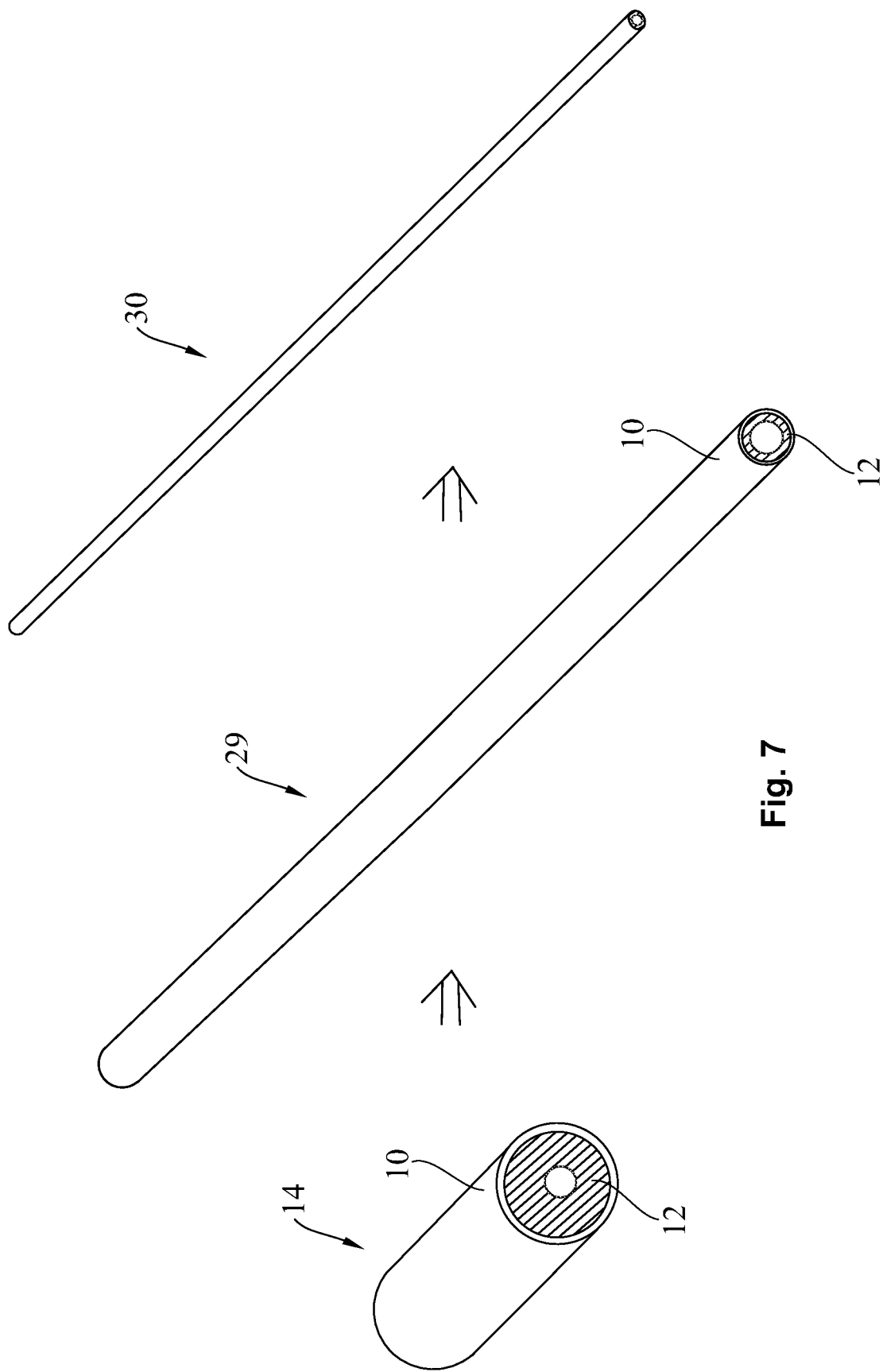
FIG. 7 illustrates the stages of a composite billet assembly, a clad pipe and/or clad mother pipe, and a cold reduced clad pipe, according to an embodiment.

As used herein, the term "clad billet" refers to the intermediate product of both a clad feedstock billet, such as the clad feedstock billet 27 shown in FIG. 6 and used to form clad bars, and to a clad pipe and/or clad mother pipe, such as the clad mother pipe 29 shown in FIG. 7 and used to form clad pipes. That is, a "clad billet" as used herein may be a clad feedstock billet, or may be a clad mother pipe. The cross-sectional area of the clad billet discussed herein is not particularly limiting, and may be a function of the cross-sectional area of the die opening 26. In a preferred embodiment, a circular cross-sectional area of the clad billet may result from a diameter of 3 inches to 10 inches of the clad billet; or from a length and width of from 3 inches to 10 inches for a square cross-sectional area. In other embodiments, the dimension (e.g., diameter, length or width) used for the cross-sectional area of the clad billet may be from about 1 inch to 20 inches after extruding. The length of the clad billet after extrusion may be from about 20 feet to 40 feet long, or may be up to about 60 feet long in some instances. These lengths of clad billets can produce an equal mass of the required extruded clad billet product. For example, the clad bar 28 shown in FIG. 7 (e.g., rebar) having a diameter of about 0.375 inches to 1.75 inches may have a length of, for example, 2500 feet, and be formed in a hot-rolling process at, for instance, a rod rolling mill.

Reductions of the clad feedstock billet 27 through multiple stages of the rod rolling mill, which reductions change the shape and form of the billet at each stage, further consolidates the metallurgical bond and makes clad thickness uniform around the circumferential (outer diameter) surface, to produce stainless clad rebar (SCR), sucker rods, and other finished clad bar products. Similarly, the clad mother pipe 29 formed by hot extrusion of the clad billet assembly 14 will be processed through multiple stages of reduction in a cold pilger mill and/or a cold draw bench to reduce the diameter and thickness of the composite wall at each stage. It may be necessary to provide intermediate stress relieving steps prior to resuming further cold reducing steps to arrive at the final dimensions of outside dimension and wall thickness of the clad pipe.

A system for producing a clad billet may include the components and devices discussed herein. For example, the system may include a (CRA) cylinder 10 including the aspects discussed herein; and a solid (CS) material 12 including the aspects discussed herein. The system may further include a cleaning device 18 including the aspects discussed herein for cleaning at least one of oxides, oils and rust from the outer surface (e.g., outer diameter 17) of the solid (CS) material 12 and the surface of the inner diameter 13 of the (CRA) cylinder 10. A heater 19 including the aspects discussed herein is provided in the system for heating the (CRA) cylinder 10 to expand at least the inner diameter 13 of the (CRA) cylinder 10. The system may include an insertion device for inserting the solid (CS) material 12 into the hollow interior of the heated (CRA) cylinder 10 so that the outer surface (e.g., outer diameter 17) of the solid (CS) material 12 faces the inner diameter 13 of the (CRA) cylinder 10. The system further includes an area, such as a room, open space, a platform to allow cooling, as discussed herein, of the heated (CRA) cylinder 10 to contract at least the inner diameter 13 of the (CRA) cylinder 10 so that the inner diameter 13 shrinks onto the outer surface (e.g., outer diameter 17) of the solid (CS) material 12, creating an interference fit at an interface 20, as discussed herein, with the outer surface (e.g., outer diameter 17) of the solid (CS) material 12, resulting in a composite billet assembly 14 having the aspects discussed herein. The system may also include a welding device 21, as discussed herein, for welding each opposite end of the composite billet assembly 14 at the interface 20 to create a seal against oxidation of the interface 20, as discussed herein. The system further includes an extruder 23, as discussed herein, for extruding the composite billet assembly 14 to reduce the size of the composite billet assembly 14 and form a clad billet having a metallurgical bond, as discussed herein, between the solid (CS) material 12 and the (CRA) cylinder 10. The clad billet may be a clad feedstock billet 27 (see, e.g., FIG. 6) or a clad mother pipe 29 (see, e.g., FIG. 7). The system may comprise a hot-rolling device, such as in a rod rolling mill or pipe mill as discussed herein, for hot-rolling a clad feedstock billet 27 to form a clad bar 28, as discussed herein. The system may comprise a cold pilgering/cold drawing device, such as in a cold pilgering/cold drawing mill, for cold pilgering/cold drawing a clad mother pipe 29 to form a clad pipe 30, as discussed herein.

FIG. 8 illustrates a flow chart representing steps associated with a method for producing a metallurgically bonded clad billet and products thereof. The method may include the embodiments and aspects discussed herein. The process may begin with a solid (CS) material 12 and a (CRA) cylinder 10 that have been machined as required to meet the dimensional tolerances for a designed interference fit, as discussed above. In step 30, the outer surface (e.g., outer diameter 17) of the solid (CS) material 12 and the inner diameter 13 of the (CRA) cylinder 10 may be cleaned, as discussed herein, to remove at least one of oxides, oils, rust, and other deleterious elements. The solid (CS) material 12 may be a bar, or may be a hollow cylinder, as discussed herein. In step 31, the (CRA) cylinder 10 is heated to expand at least the inner diameter 13 of the (CRA) cylinder 10, as discussed herein. In step 32, the solid (CS) material 12 is inserted into the hollow interior 11 of the (CRA) cylinder 10, so that an outer surface (e.g., outer diameter 17) of the solid (CS) material 12 faces the inner diameter 13 of the (CRA) cylinder 10, as discussed herein. In step 33, the (CRA) cylinder 10 is cooled, or allowed to cool, as discussed herein, in order to contract at least the inner diameter 13 of the (CRA) cylinder 10 so that the inner diameter 13 shrinks onto the outer surface (e.g., outer diameter 17) of the solid (CS) material 12, creating an interference fit at an interface 20 with the outer surface (e.g., outer diameter 17), as discussed herein, resulting in a composite billet assembly 14. In step 34, each opposite end of the composite billet assembly 14 may be welded at the interface 20, as discussed herein, to create a seal against oxidation of the interface 20. In step 35, the composite billet assembly 14 is hot extruded, such as with the extrusion press 23 discussed herein, to reduce the size of the composite billet assembly 14 and form a required length of a clad billet having a metallurgical bond between the solid (CS) material 12 and the (CRA) cylinder 10, as discussed herein. The clad billet may be a clad feedstock billet 27 or a clad mother pipe 29, as discussed herein. As discussed herein, the metallurgical bond is an atom-to-atom bond between the solid (CS) material 12 and the (CRA) cylinder 10. The process then proceeds to either step 36 or step 37. In step 36, the clad feedstock billet 27 is fed to a hot-rolling device, such as at a rod rolling mill as discussed herein, to form a clad product. Hot-rolling a clad feedstock billet 27 having a bar-shaped solid (CS) material 12 forms a clad bar 28. On the other hand, in step 37 the clad mother pipe 29 is fed to a cold pilgering/cold drawing device, such as at a cold pilgering/cold drawing mill as discussed herein, to form a clad pipe 30. That is, cold pilgering/cold drawing a clad mother pipe 29 having a hollow cylinder-shaped solid (CS) material 12 forms a clad pipe 30.

FIGS. 9A to 9C illustrate a second embodiment of forming a composite billet assembly 140, in which the composite billet assembly is formed by explosion bonding. The second embodiment involves inserting a (CS) material 120 into a slightly larger diameter (CRA) cylinder 100. The (CRA) cylinder 100 in this embodiment may be formed of the same materials as the (CRA) cylinder 10 discussed above. Aside from the slightly larger diameter, the (CRA) cylinder 100 may also have the general same size and shape and other physical dimensions as the (CRA) cylinder 10 discussed above, e.g., the (CRA) cylinder 100 may have a hollow interior 110 extending throughout a length of the (CRA) cylinder 100, an inner diameter 130, and an outer diameter 150. The length of the (CRA) cylinder 100 is not particularly limiting, and in a preferred embodiment the length may be about 2 feet to 40 feet or more. The outer diameter 150 of the (CRA) cylinder 100 is not particularly limiting, and in a preferred embodiment the outer diameter 150 may be about 4 inches to 30 inches. The thickness of the (CRA) cylinder 100 is not particularly limiting, and in a preferred embodiment the thickness may be about 0.5 inches to 2.5 inches.

The solid carbon or low-alloy steel (CS) material 120 shown in FIG. 9B may be formed of the same materials as the (CS) material 12 discussed above. The (CS) material 120 may also have the same size and shape and other physical dimensions as the (CS) material 12 discussed above, e.g., the (CS) material 120 may be a "solid", meaning that the structure or nature of the carbon or low-alloy steel (CS) material 120 is substantially rigid, as opposed to a liquid, molten or powder form. In the embodiment of FIG. 9B, the (CS) material 120 is shaped as a bar, or block of material having an outer diameter 170. The length of the (CS) material 120 is not particularly limiting, and in a preferred embodiment the length may be about 2 feet to 40 feet or more.

FIG. 9C illustrates one of the steps for forming a composite billet assembly 140 by explosion bonding. The (CS) material 120 is inserted into the (CRA) cylinder 100 so that the (CS) material 120 and the (CRA) cylinder 100 have a concentric relationship. The insertion may be performed with a lift device (not shown). The size of the inner diameter 130 of the (CRA) cylinder 100 should be larger than the outer diameter 170 of the (CS) material 120 so that a standoff gap 115 is provided between the inner diameter 130 of the (CRA) cylinder 100 and the outer diameter 170 of the (CS) material 120 when the (CS) material 120 is inserted into the (CRA) cylinder 100. The standoff gap 115 may be uniform and concentric between the inner diameter 130 of the (CRA) cylinder 100 and the outer diameter 170 of the (CS) material 120 when the (CS) material 120 is inserted into the (CRA) cylinder 100. The size of the standoff gap 115 may range from 0.125 inches to 0.25 inches or more around the (CS) material 120, and may be selected to assure that the (CRA) cylinder 100 collides with the (CS) material 120 after accelerating to a specific collision velocity. The standoff distance typically varies from 0.5 to 4 times the thickness of the (CRA) cylinder 100, and may be dependent upon a choice of impact parameters. A cylindrical containment frame 116 may be provided concentrically around the (CRA) cylinder 100. The containment frame 116 may include or form an annulus 117 that can contain a volume of explosive material 118 around the outer diameter 150 of the (CRA) cylinder 100. The explosive material 118 may completely surround the (CRA) cylinder 100. In FIG. 9C however, the explosive material 118 is cut away in the front portion for illustrative purposes to better show the (CRA) cylinder 100 within the surrounding explosive material 118. The explosive material 118 may include commercially available products based on ammonium nitrate, and may be granular and/or an explosive mix. The explosive material 118 may be uniformly distributed around the outer diameter 150 of the (CRA) cylinder 100, and may fill the containment frame 116. A fuse (not shown) may be located in or proximate the explosive material 118 for detonating the explosive material. In this embodiment, the length of the (CS) material 120 may be the same as the length of the (CRA) cylinder 100, and may be up to 40 feet or more.

Before insertion of the (CS) material 120 into the (CRA) cylinder 100, the (CS) material 120 and the (CRA) cylinder 100 may be machined as required to meet strict dimensional tolerances for a designed interface diameter. Next, the mating surfaces, i.e., the inner diameter 130 of the (CRA) cylinder 100 and the outer diameter 170 of the (CS) material 120 may be cleaned of all contaminants and deleterious elements, such as oxides, oils, and rust, grease, industrial dust and particulates. The cleaning may be performed by grinding or by a cleaning device 180, such as an abrasive blaster using an abrasive media to remove deleterious materials and leave a fresh, un-oxidized surface. Other types of cleaning devices 180 may include machining devices used to form the (CRA) cylinder 100 and the (CS) material 120 to specified tolerances, and may include solvents that remove oils and grease without leaving a residue.

The explosion bonding process is initiated when the fuse is lit to detonate the explosive material 118 in the annulus 117 of the containment frame 116. The explosive material 118 may be detonated at a predetermined point on the outer diameter 150 of the (CRA) cylinder 100 using a high velocity explosive booster. The detonation creates an explosion wavefront that travels away from the initiation point at one end of the (CRA) cylinder 100 and axially across the (CRA) cylinder 100 to the opposite end at a specified detonation rate (the speed at which the detonation wavefront travels across the explosive layer). The detonation rate must be subsonic to the acoustic velocities of the (CRA) and (CS) metals. The gas expansion of the explosive detonation accelerates the (CRA) cylinder 100 across the standoff gap 115 resulting in an angular collision at the specified collision velocity. The resultant impact creates very high-localized pressures at the collision point. These pressures travel away from the collision point at the acoustic velocity of the metals. Because the collision is moving forward at a subsonic rate, pressures are created at the immediately approaching adjacent surfaces, which are sufficient to spall a thin layer of metal from each surface and eject it away in a jet. The surface contaminants, oxides and impurities are stripped away in the jet. At the collision point, the newly created clean metal surfaces impact at high pressures of several GPa. Although there is much heat generated in the explosive detonation, there is no time for heat transfer to the metals. This process causes at least the inner diameter 130 of the (CRA) cylinder 100 to collapse onto the outer surface (e.g., the diameter 170) of the (CS) material 120, eliminating the standoff gap 115, and creating at least a partial metallurgical bond at an interface 200, or mating area of the inner diameter 130 of the (CRA) cylinder 100 and the outer surface or diameter 170 of the (CS) material 120. The mated (CS) material 120/(CRA) cylinder 100 creates a composite billet assembly 140 having a core formed by the (CS) material 120 and an outer cladding formed by the (CRA) cylinder 100.

Figure 10A:
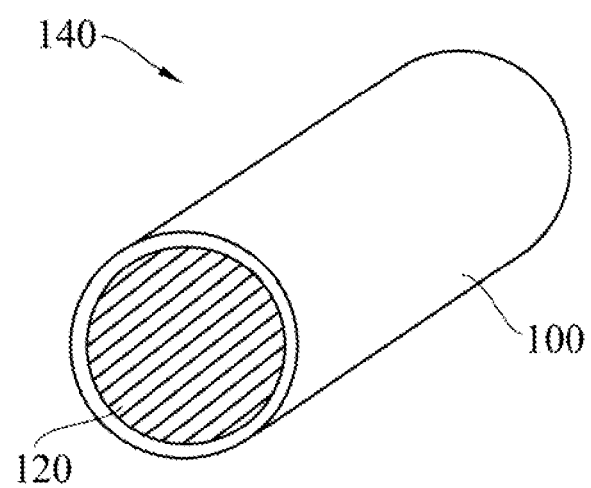
FIG. 10A illustrates a perspective view of the metallurgically bonded composite billet assembly according to the second embodiment.
Figure 10B:
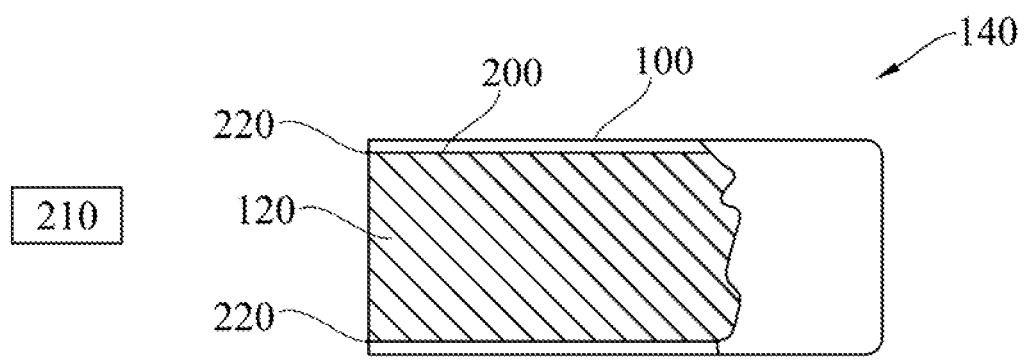
FIG. 10B illustrates a cross-sectional view of the metallurgically bonded composite billet assembly according to the second embodiment.

FIG. 10A illustrates a perspective view of the composite billet assembly 140. In the illustrated embodiment, the composite billet assembly 140 includes a (CRA) cylinder 100 bonded to a bar-shaped (CS) material 120 core. The explosion bond at the interface 200 may be protected from oxidation by welding the interface 200 at opposite ends (i.e., top and bottom ends) of the composite billet assembly 140 with a welding device (not shown). The resulting welds 220 create a seal against oxidation of the interface 200 during heating of the composite billet assembly prior to extrusion. FIG. 10B illustrates a cross-sectional view of the composite billet assembly 140 of FIG. 10A, and shows a cross-sectional view of the (CS) material 120 core, the outer (CRA) cylinder 100 layer, and the welds 220 at the end of the composite billet assembly 140 that seal the interface 200.

Figure 11A:
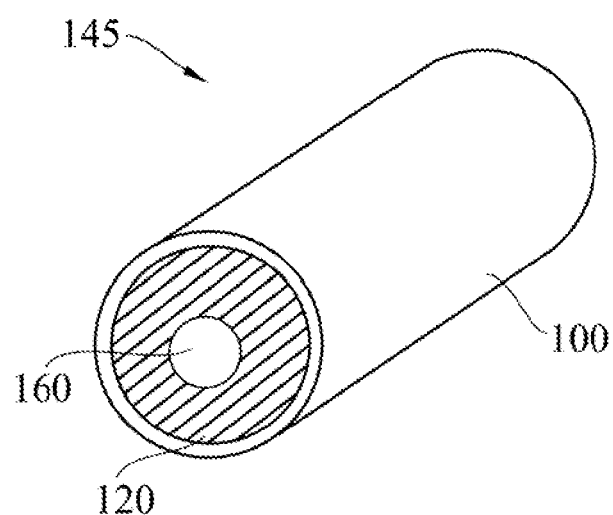
FIG. 11A illustrates a perspective view of the metallurgically bonded composite billet assembly for a pipe formed by drilling machining or trepanning the composite billet shown in FIG. 10A, according to the second embodiment.
Figure 11B:
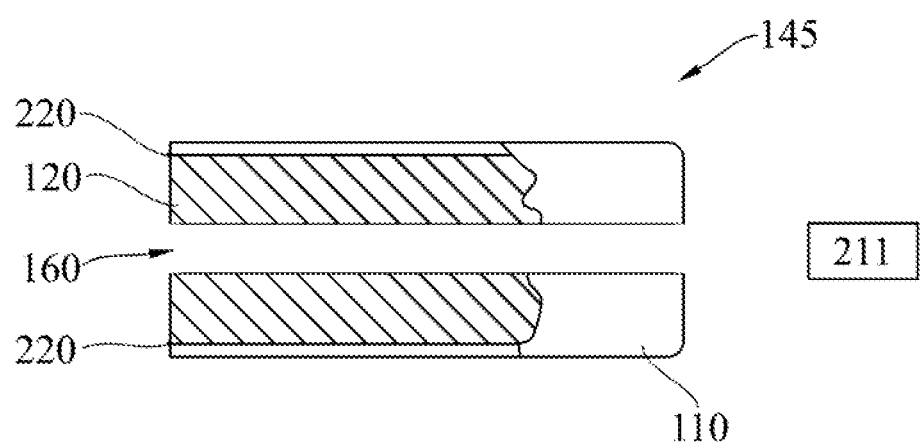
FIG. 11B illustrates a cross-sectional view of the metallurgically bonded composite billet assembly of FIG. 11A according to the second embodiment.

For pipe/tube production, in which a hollow cylinder (CS) material 120 is required as the core for the composite billet, the bonded composite billet 140 as shown in FIG. 10A is first produced. The center core of the composite billet 140 is then drilled, machined or trepanned to produce a composite pipe billet 145 as shown in FIGS. 11A and 11B. This may be accomplished with a tool 211 such as a drill, a machining device, or a trepanning device, as is known in the art. FIG. 11B illustrates a cross-sectional view of the composite pipe billet 145, and shows the hollow (CS) material 120 core after machining, the outer (CRA) cylinder 100, and the welds 220 at the end of the composite billet 145 that seal the interface 200. As shown in FIGS. 11A and 11B, the (CS) core is shaped as a hollow cylinder including a hollow interior 160 extending throughout the length of the (CS) material 120. On other respects, the (CS) material 120 may have the same size, shape and other physical characteristics and dimensions of the (CS) material 12 of FIG. 1C.

Figure 12:
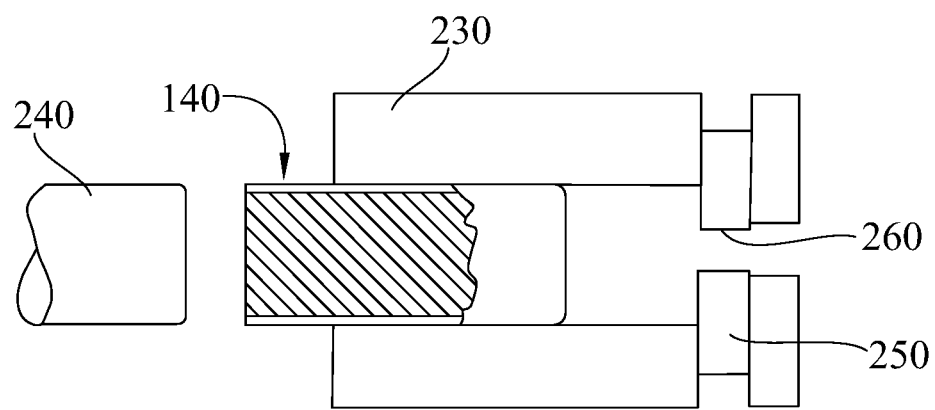
FIG. 12 illustrates an embodiment of an extrusion press for the second embodiment.
Figure 13:
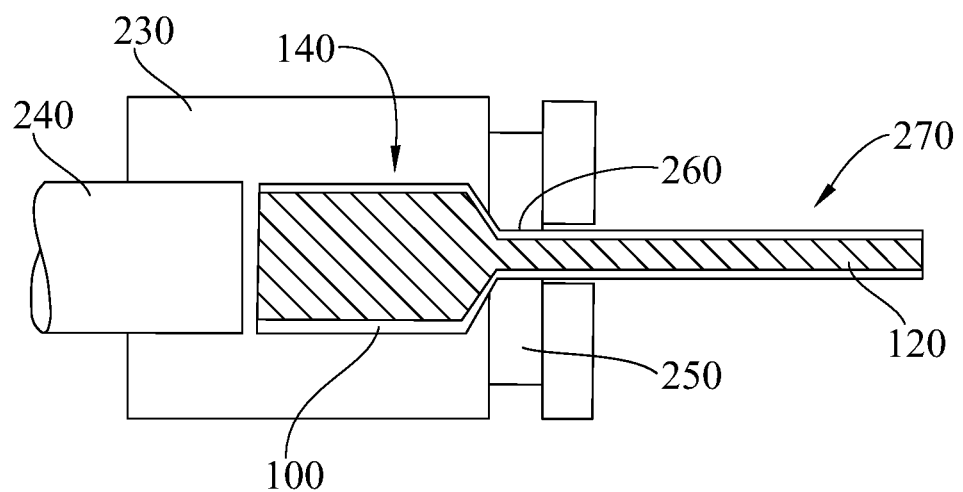
FIG. 13 illustrates an embodiment of an extrusion process for the second embodiment.
Figure 14:
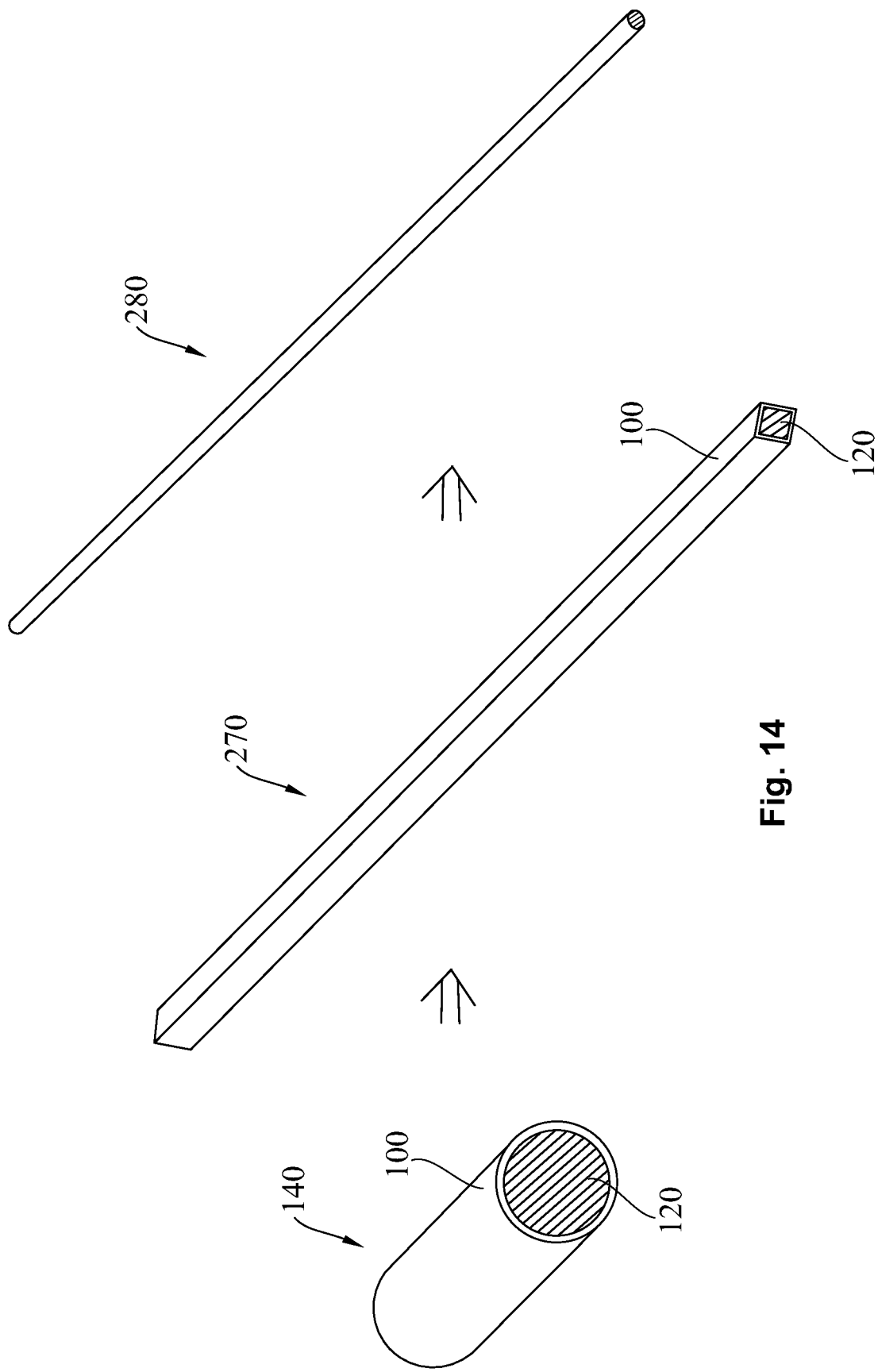
FIG. 14 illustrates the stages of a composite billet assembly, a clad feedstock billet, and a clad bar, according to the second embodiment.

FIG. 12 illustrates an embodiment of an extruder, such as an extrusion press 230 for extruding the composite billet assembly 140 at high temperatures to reduce the size of the composite billet assembly 140 and form a clad feedstock billet 270 (see FIG. 14). For forming a clad pipe and/or clad mother pipe 290 (see FIG. 15) from the composite billet assembly 145, the extrusion press 230 is fitted with a cylindrical mandrel (not shown), which is inserted into the inner cylindrical opening of the composite billet assembly 145, and extends beyond the die opening 260 of the die 250 for some length to form the inner diameter of the extruded clad pipe and/or clad mother pipe. The composite billet assembly 140, 145 is first heated in a furnace (not shown) to a predetermined high temperature and rapidly transferred to the extrusion press 230 so as to not cool below the preset extrusion temperature, and extruded at the extrusion press 230. The extrusion press 230 includes a press ram 240 that presses the composite billet assembly 140, 145 through the die opening 260 of a die 250. During extrusion, the composite billet assembly 140, 145 undergoes significant cross-sectional size reduction by passing through the die opening 260, as shown in FIG. 13, under very high pressures, such as 20,000 psi to 70,000 psi, depending on the capacity of the press, applied at high temperatures, such as 1800° F. to 2400° F. The size of the composite billet assembly 140, 145 is reduced by the extrusion press 230 reducing a thickness of each of the (CRA) cylinder 100 and the solid (CS) material 120. The proportion of the thickness reduction of the (CRA) cylinder 100 and the solid (CS) material 120 is the same throughout the cross-sectional area of the composite billet assembly 140, 145 and along the length of the of the composite billet assembly 140, 145 as it passes through the die opening 260.

As the size of the composite billet assembly 140, 145 is reduced through the die opening 260, clean, fresh, new un-oxidized surfaces of the composite billet assembly 140, 145 are created at the interface 200 between the (CS) material 120 and the (CRA) cylinder 100 and forced to metallurgically bond at the interface 200 as the composite billet assembly 140, 145 elongates to its new shape. The metallurgical bond is an atom-to-atom bond between the (CS) material 120 and the (CRA) cylinder 100, and assures that the metallurgical bond that may not be 100% from explosion bonding alone is converted to a 100% metallurgical bond. In the composite billet assembly interface 200, the material of the (CS) material 120 is in intimate contact with the material of the (CRA) cylinder 100, with no gaps therebetween to entrap oxygen and oxidize upon heating. Thus, when the new surfaces are being created as the composite billet assembly 140, 145 undergoes significant reductions at high pressures and temperatures, a 100% metallurgical bond is created between the material of the (CS) material 120 and the material of the (CRA) cylinder 100. The metallurgical bond is a critical factor for determining success or failure of the resulting clad feedstock billet 270 (see FIG. 14) and the clad pipe and/or clad mother pipe 290 (see FIG. 15). Once the bond is created, it is nearly indestructible, with the two materials of the (CS) material 120 and the (CRA) cylinder 100 joined to become one unitized material and perform just like any other solid material. This allows the clad feedstock billet 270 to then be hot rolled to a clad bar 280 (see FIG. 14) in the form of, for example, rebar, sucker rod stock, shafts and other products that can be easily bent, fabricated in a shop and the field, and welded as needed, to provide excellent service and design life in corrosive environments. Similarly, the clad mother pipe 290 may be cold pilgered and/or cold drawn to a clad pipe 300 (see FIG. 15) that can be easily bent, fabricated in a shop and the field, and welded as needed, to provide better service and design life in corrosive environments. It is noted that the thickness of the (CRA) cylinder 100 before extrusion is drastically reduced proportionately after extrusion, so that the (CRA) cylinder 100 forms a relatively thin clad material layer around the outer diameter of the clad feedstock billet 270 (see FIG. 14) and the clad pipe and/or clad mother pipe 290 (see FIG. 15).

The cross-sectional shape of the clad feedstock billet 270, shown in FIG. 14, after the extruding process is not particularly limiting, and in preferred embodiments the cross-sectional shape is one of a circle, a cylinder, a rectangle, and a square. The cross-sectional shape is determined by the shape of the die opening 260, and so the die opening 260 may have a shape that is one of a circle, a cylinder, a rectangle, and a square. Other polygonal cross-sectional shapes are possible, and depend on the shape of the die opening 260. That is, the die opening 260 may have a polygonal or angular shape other than a circle, a cylinder, a rectangle, and a square. Thus, the clad feedstock billet 270 can be produced to the exact feedstock dimensional requirements of a rod rolling mill. The cross-sectional shape of the clad mother pipe 290, shown in FIG. 15, after the extruding process is circular according to a preferred embodiment. The clad mother pipe 290 can be produced to the exact dimensional requirements of a cold pilcer/cold draw mill.

Figure 15:
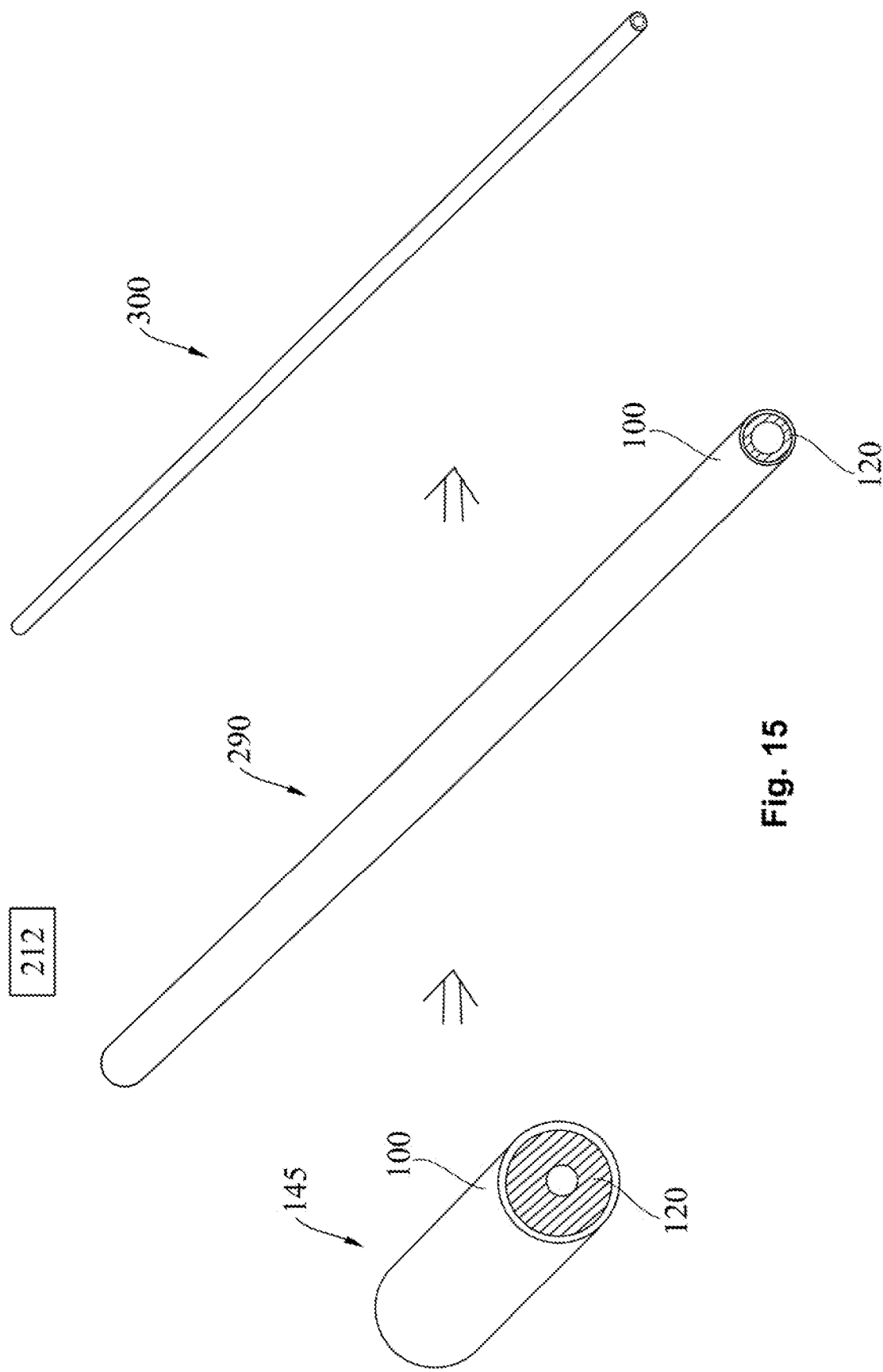
FIG. 15 illustrates the stages of a composite billet assembly, a clad pipe and/or mother pipe, and a clad pipe, according to the second embodiment.

As discussed above, the term "clad billet" refers to the intermediate product of both a clad feedstock billet, such as the clad feedstock billet 270 shown in FIG. 14 and used to form clad bars, and to a clad pipe and/or clad mother pipe, such as the clad mother pipe 290 shown in FIG. 15 and used to form clad pipes. That is, a "clad billet" as used herein may be a clad feedstock billet, or may be a clad mother pipe. The cross-sectional area of the clad billet discussed herein is not particularly limiting, and may be a function of the cross-sectional area of the die opening 260. In a preferred embodiment, a circular cross-sectional area of the clad billet may result from a diameter of 3 inches to 10 inches of the clad billet; or from a length and width of from 3 inches to 10 inches for a square cross-sectional area. In other embodiments, the dimension (e.g., diameter, length or width) used for the cross-sectional area of the clad billet may be from about 1 inch to 20 inches after extruding. The length of the clad billet after extrusion may be from about 20 feet to 40 feet long, or may be up to about 60 feet long in some instances. These lengths of clad billets can produce an equal mass of the required extruded clad billet product. For example, the clad bar 280 shown in FIG. 14 (e.g., rebar) having a diameter of about 0.375 inches to 1.75 inches may have a length of, for example, 2500 feet, and be formed in a hot-rolling process at, for instance, a rod rolling mill.

Reductions of the clad feedstock billet 270 through multiple stages of the rod rolling mill, which reductions change the shape and form of the billet at each stage, further consolidates the metallurgical bond and makes clad thickness uniform around the circumferential (outer diameter) surface, to produce stainless clad rebar (SCR), sucker rod feedstock, and other finished clad bar products. Similarly, the clad mother pipe 290 formed by hot extrusion of the clad billet assembly 145 will be processed through multiple stages of reduction in a cold pilger mill and/or a cold draw bench to reduce the diameter and thickness of the composite wall at each stage. It may be necessary to provide intermediate stress relieving steps prior to resuming further cold reducing steps to arrive at the final dimensions of outside dimension and wall thickness of the outer diameter clad pipe or tube.

A system for producing a clad billet may include the components and devices discussed herein. For example, the system may include a (CRA) cylinder 100 including the aspects discussed herein; and a solid (CS) material 120 including the aspects discussed herein. The system may further include a cleaning device 18 including the aspects discussed herein for cleaning at least one of oxides, oils and rust from the outer surface (e.g., outer diameter 170) of the solid (CS) material 120 and the surface of the inner diameter 130 of the (CRA) cylinder 100. The system may include an insertion device or lift device for inserting the solid (CS) material 120 into the hollow interior 110 of the (CRA) cylinder 100 so that the outer surface (e.g., outer diameter 170) of the solid (CS) material 120 faces the inner diameter 130 of the (CRA) cylinder 100. The system further includes an explosive material 118 for surrounding the (CRA) cylinder 100, and may include a containment frame 116 around the outer diameter 150 of the (CRA) cylinder 100 to create an annulus 117 between the containment frame 116 and the outer diameter 150 of the (CRA) cylinder 100. A volume of the explosive material 118 may be located in the annulus 117. An ignition source also is provided for detonating the explosive material 118 to collapse at least the inner diameter 130 of the (CRA) cylinder 100 onto the outer surface (e.g., outer diameter 170) of the (CS) material 120 eliminating the standoff gap 115 and creating a at least a partial metallurgical bond at an interface 200, as discussed herein, with the outer surface (e.g., outer diameter 170) of the solid (CS) material 120, resulting in a composite billet assembly 140 including the aspects discussed herein.

The system may also include a welding device 210, as discussed herein, for welding each opposite end of the composite billet assembly 140 at the interface 200 to create a seal against oxidation of the interface 200, as discussed herein. The system further includes an extruder 230, as discussed herein, for extruding the composite billet assembly 140, 145 to reduce the size of the composite billet assembly 140, 145 and form a clad feedstock billet having a metallurgical bond, as discussed herein, between the solid (CS) material 120 and the (CRA) cylinder 100. The clad billet may be a clad feedstock billet 270 (see, e.g., FIG. 14), or a clad mother pipe 290 (see, e.g., FIG. 15) formed by performing an additional step of drilling, machining, or trepanning out a central bore to create the proper (CS) wall thickness in the composite billet for extruding the clad pipe/clad mother pipe 290. The system may comprise a hot-rolling device, such as in a rod rolling mill or pipe mill as discussed herein, for hot-rolling a clad feedstock billet 270 to form a clad bar 280, as discussed herein. The system may comprise a cold pilgering/cold drawing device 212, such as in a cold pilgering/cold drawing mill, for cold pilgering/cold drawing a clad mother pipe 290 to form a clad pipe 300, as discussed herein.

Figure 16:
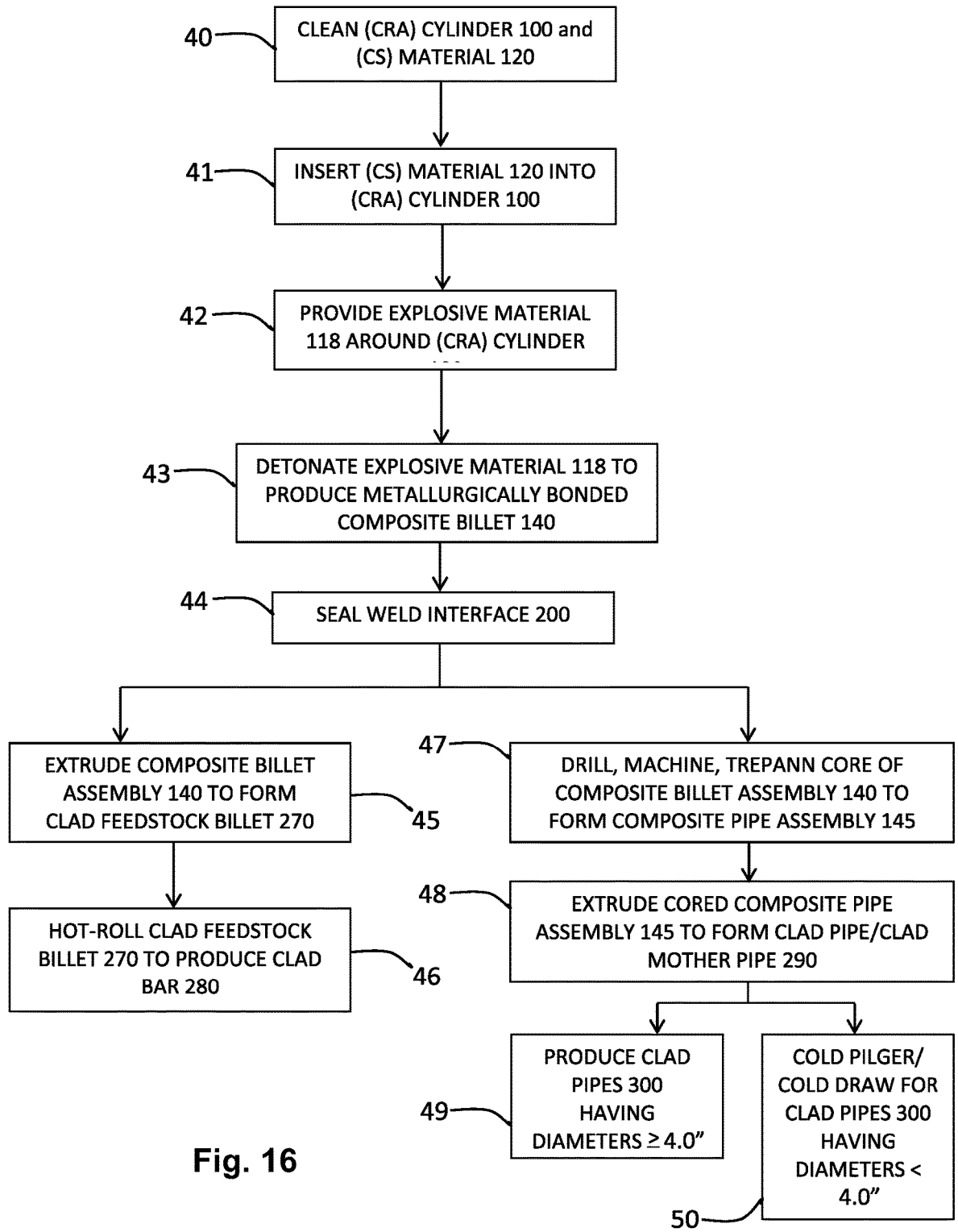
FIG. 16 illustrates the steps associated with methods of producing a clad billet and/or clad pipes, and products thereof, according to the second embodiment.

FIG. 16 illustrates a flow chart representing steps associated with a method for producing a metallurgically bonded clad billet and products thereof via explosion bonding. The method may include the embodiments and aspects discussed herein. The process may begin with a solid (CS) material 120 and a (CRA) cylinder 100 that have been machined as required to meet the dimensional tolerances for the explosion bonding assembly setup, as discussed above. In step 40, the outer surface (e.g., outer diameter 170) of the solid (CS) material 120 and the inner diameter 130 of the (CRA) cylinder 100 may be cleaned, as discussed herein, to remove at least one of oxides, oils, rust, and other deleterious elements. The solid (CS) material 120 may be a bar as discussed herein. In step 41, the solid (CS) material 120 is inserted into the hollow interior 110 of the (CRA) cylinder 100, so that an outer surface (e.g., outer diameter 170) of the solid (CS) material 120 concentrically faces the inner diameter 130 of the (CRA) cylinder 100, and a standoff gap 115 is provided between the outer surface (e.g., outer diameter 170) of the solid (CS) material 120 and the inner diameter 130 of the (CRA) cylinder 100, as discussed herein. In step 42, an explosive material 118 is provided around the outer diameter 150 of the (CRA) cylinder 100, as discussed herein. In this step, a containment frame 116 may be provided around the outer diameter 150 of the (CRA) cylinder 100 to create an annulus 117 between the containment frame 116 and the outer diameter 116 of the (CRA) cylinder 100, in which the explosive material 118 is located. In step 43, the explosive material 118 is detonated, as discussed herein, to collapse at least the inner diameter 130 of the (CRA) cylinder 100 onto to the outer surface (e.g., outer diameter 170) of the solid (CS) material 120, thus eliminating the standoff gap 115 and creating at least a partial metallurgical bond at an interface 200 with the outer surface (e.g., outer diameter 170) and resulting in a composite billet assembly 140. In step 44, each opposite end of the composite billet assembly 140 may be welded at the interface 200, as discussed herein, to create a seal against oxidation of the interface 200. The composite billet assembly 140 may then be cleaned, straightened if necessary, and then made ready for the next steps.

The process then proceeds to either step 45 or step 47. In step 45, the composite billet assembly 140 is hot extruded, such as with the extrusion press 230 discussed herein, to reduce the size of the composite billet assembly 140 and form a clad billet having a metallurgical bond between the solid (CS) material 120 and the (CRA) cylinder 100, as discussed herein. As discussed herein, the metallurgical bond resulting from the extrusion is a 100% atom-to-atom bond between the solid (CS) material 120 and the (CRA) cylinder 100. The clad billet may be a clad feedstock billet 270 as discussed herein. The process proceeds from step 45 step 46, in which the clad feedstock billet 270 is fed to a hot-rolling device, such as at a rod rolling mill as discussed herein, to form a clad product. Hot-rolling a clad feedstock billet 270 having a bar-shaped solid (CS) material 120 forms a clad bar 280.

On the other hand, the process may proceed to step 47 instead of step 45. In step 47 the composite billet assembly 140 is machined, drilled or trepanned to produce a composite billet pipe assembly 145, as shown in FIGS. 11A and 11B. The process then proceeds to step 48 at which the composite billet pipe assembly 145 is hot extruded, such as with the extrusion press 230 discussed herein, to reduce the size of the composite billet pipe assembly 145 and form a clad pipe/clad mother pipe 290 having a 100% metallurgical bond between the solid (CS) material 120 and the (CRA) cylinder 100, as discussed herein. As discussed herein, the metallurgical bond is a 100% atom-to-atom bond between the solid (CS) material 120 and the (CRA) cylinder 100. At step 49, the clad pipe 300 thus formed may have an outer diameter greater than or equal to 4.0 inches. On the other hand, the process may proceed from step 48 to step 50 when it is desired to produce a clad pipe 300 having an outer diameter less than 4.0 inches. In step 50 the clad mother pipe 290 is fed to a cold pilgering/cold drawing device, such as at a cold pilgering/cold drawing mill as discussed herein, to form a clad pipe 300. That is, cold pilgering/cold drawing a clad mother pipe 290 having a hollow cylinder-shaped solid (CS) material 120 forms a clad pipe 300 that may have outer diameter less than 4.0 inches.

While various embodiments usable within the scope of the present disclosure have been described with emphasis, it should be understood that within the scope of the appended claims, the present invention may be practiced other than as specifically described herein.

What is claimed is:
1. A method of producing a clad billet, comprising:
providing a corrosion resistant alloy cylinder, the corrosion resistant alloy cylinder including a hollow interior, an inner diameter, and an outer diameter,
inserting a solid carbon or low-alloy steel material into the hollow interior of the corrosion resistant alloy cylinder so that an outer surface of the solid carbon or low-alloy steel material faces the inner diameter of the corrosion resistant alloy cylinder, and so that a concentric standoff gap is provided between the outer surface of the solid carbon or low-alloy steel material and the inner diameter of the corrosion resistant alloy cylinder;
providing an explosive material around the outer diameter of the corrosion resistant alloy cylinder;
detonating the explosive material to collapse at least the inner diameter of the corrosion resistant alloy cylinder onto the outer surface of the solid carbon or low-alloy steel material and eliminate the standoff gap, creating a partial metallurgical bond at an interface with the outer surface and resulting in a composite billet assembly;
welding each opposite end of the composite billet assembly at the interface to create a seal against oxidation of the interface; and
extruding the composite billet assembly to reduce the size of the composite billet assembly by reducing a thickness of each of the corrosion resistant alloy cylinder and the solid carbon or low-alloy steel material and form the clad billet having a 100% metallurgical bond between the solid carbon or low-alloy steel material and the corrosion resistant alloy cylinder.

2. The method of claim 1, further comprising:
cleaning the outer surface of the solid carbon or low-alloy steel material and the surface of the inner diameter of the corrosion resistant alloy cylinder, before inserting the solid carbon or low-alloy steel material into the hollow interior of the corrosion resistant alloy cylinder.

3. The method of claim 2, wherein the cleaning removes at least one of oxides, oils and rust.

4. The method of claim 1, further comprising:
providing a containment frame around the outer diameter of the corrosion resistant alloy cylinder to create an annulus between the containment frame and the outer diameter of the corrosion resistant alloy cylinder, wherein the explosive material is located in the annulus.

5. The method of claim 1, wherein the composite billet assembly comprises an outer diameter of 3 inches to 45 inches, and the clad billet comprises a cross-sectional dimension of 1 inch to 20 inches after the extruding.

6. The method of claim 1, further comprising:
hot-rolling the clad billet to form a clad rod.

7. The method of claim 1, wherein the composite billet assembly is drilled, machined or trepanned to form a composite pipe billet assembly for the extruding.

8. The method of claim 7, further comprising:
at least one of cold pilgering and cold drawing the composite billet after the extruding to form a clad pipe.

9. The method of claim 1, wherein the solid carbon or low-alloy steel material is a bar.

10. The method of claim 1, wherein the composite billet assembly has a length of 20 feet to 60 feet, and a cross-sectional dimension of 3 inches to 10 inches.

11. The method of claim 1, wherein the metallurgical bond is an atom-to-atom bond between the solid carbon or low-alloy steel material and the corrosion resistant alloy cylinder.

12. A system for producing a clad billet, comprising:
a corrosion resistant alloy cylinder including a hollow interior, an inner diameter, and an outer diameter;
a solid carbon or low-alloy steel material inserted into the hollow interior of the corrosion resistant alloy cylinder so that a concentric standoff gap is provided between the outer surface of the solid carbon or low-alloy steel material and an inner diameter surface of the corrosion resistant alloy cylinder;
an explosive material for surrounding the corrosion resistant alloy cylinder;
an ignition source for detonating the explosive material to collapse at least the inner diameter of the corrosion resistant alloy cylinder onto the outer surface of the solid carbon or low-alloy steel material and eliminate the standoff gap, creating a partial metallurgical bond at an interface with the outer surface and resulting in a composite billet assembly;
a welding device for welding each opposite end of the composite billet assembly at the interface to create a seal against oxidation of the interface; and
an extruder for extruding the composite billet assembly to reduce the size of the composite billet assembly by reducing a thickness of each of the corrosion resistant alloy cylinder and the solid carbon or low-alloy steel material and form the clad billet having a 100% metallurgical bond between the solid carbon or low-alloy steel material and the corrosion resistant alloy cylinder.

13. The system of claim 12, further comprising:
a containment frame around the outer diameter of the corrosion resistant alloy cylinder to create an annulus between the containment frame and the outer diameter of the corrosion resistant alloy cylinder, wherein the explosive material is located in the annulus.

14. The system of claim 12, further comprising:
a cleaning device for cleaning at least one of oxides, oils and rust from the outer surface of the solid carbon or low-alloy steel material and the surface of the inner diameter of the corrosion resistant alloy cylinder.

15. The system of claim 12, further comprising:
a hot-rolling device for hot-rolling the clad billet to form a clad rod.

16. The system of claim 12, further comprising:
a tool for drilling, machining, or trepanning the composite billet assembly to form a composite pipe billet assembly.

17. The system of claim 16, further comprising:
a cold pilgering/cold drawing device for at least one of cold pilgering and cold drawing the composite pipe billet assembly after extrusion to form a clad pipe.

18. The system of claim 12, wherein the composite billet assembly has a length of 20 feet to 60 feet, and a cross-sectional dimension of 3 inches to 10 inches.

* * * * *